March 13, 1934.  B. MORSE  1,950,902
COTTON STRIPPER
Filed March 11, 1932   2 Sheets-Sheet 1
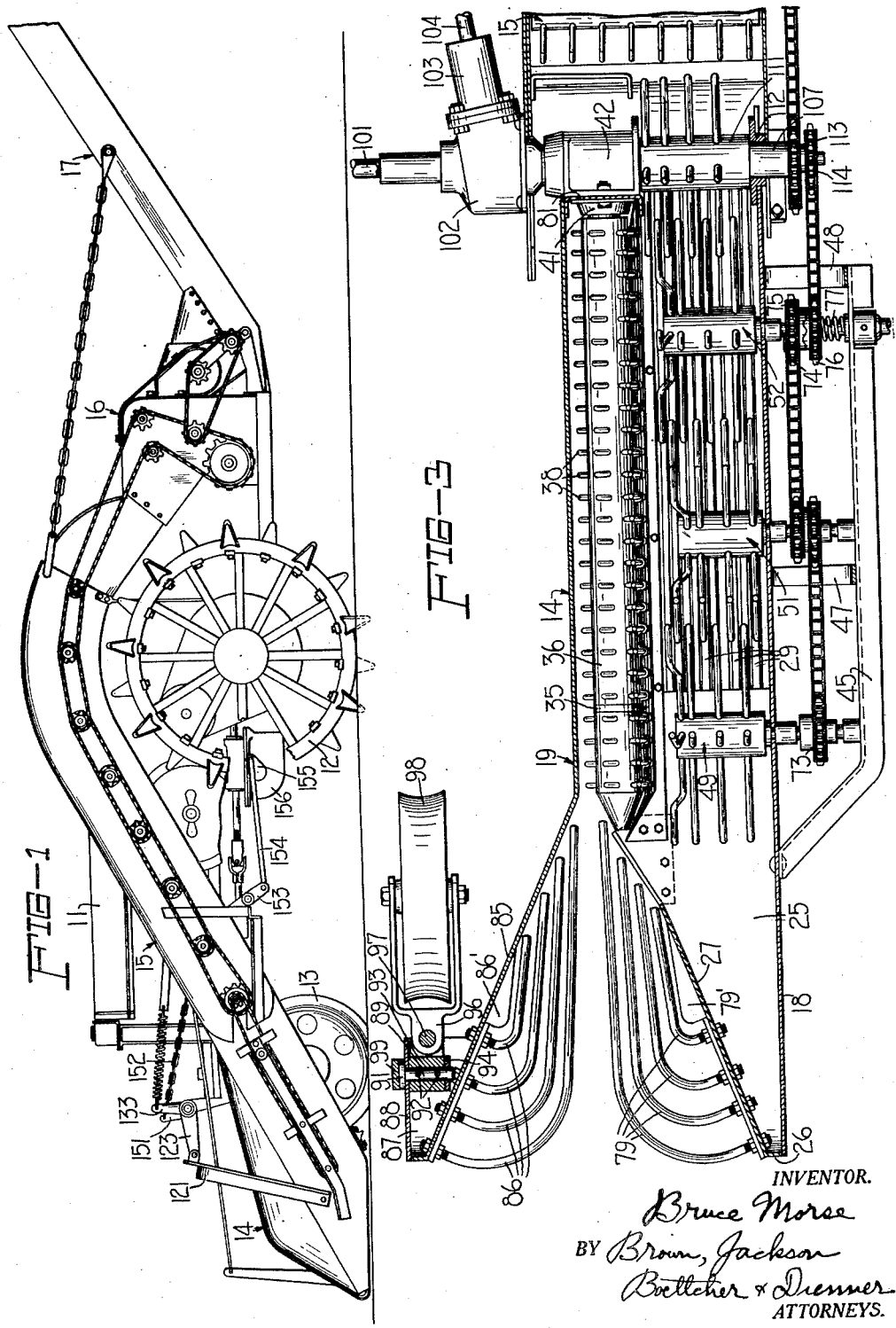
INVENTOR.
Bruce Morse
BY Brown, Jackson
Boettcher & Dienner
ATTORNEYS.

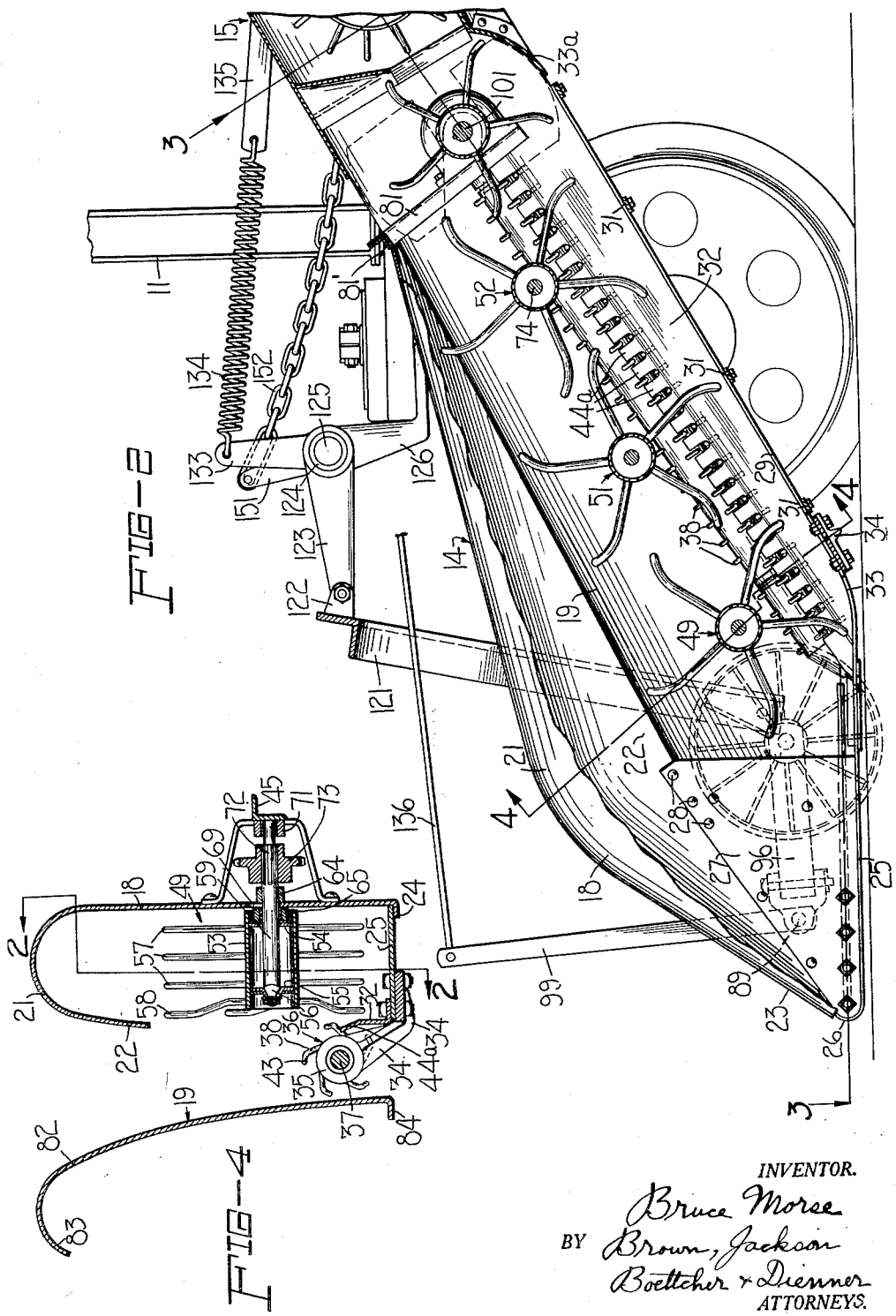

Patented Mar. 13, 1934

1,950,902

UNITED STATES PATENT OFFICE 1,950,902

COTTON STRIPPER

Bruce Morse, Crosbyton, Tex., assignor to Deere & Company, Moline, Ill., a corporation of Illinois Application March 11, 1932, Serial No. 598,151

18 Claims. (Cl. 56—11)

The present invention relates generally to harvesters and more particularly to a cotton stripper adapted to be mounted upon a general purpose tractor and to be operated by suitable power take-off connections therefrom.

Many attempts have been made to construct satisfactory and efficient devices for harvesting such crops as cotton and the like and in a number of instances the machines developed have met with considerable success. In general, however, such machines are relatively complicated, involving many parts, and more or less expensive to manufacture and maintain. It is therefore, the principal object of the present invention to provide a simple and efficient cotton stripper, yet one which comprises relatively few parts and is inexpensive to manufacture and to maintain.

Briefly, the present invention contemplates the provision of an agricultural implement in the form of a cotton stripper utilizing a single stripping roll and a smooth wall positioned adjacent thereto whereby the number of operating parts in such a machine can be materially reduced with a consequent reduction in weight, cost of manufacture, and amount of power required for the successful operation thereof.

Other objects and advantages of the present invention will be apparent to those skilled in the art after a consideration of the following detailed description of the preferred structural embodiment, taken in connection with the accompanying drawings, in which:

Figure 1 is a side elevation of a cotton harvester embodying the salient features of the present invention;

Figure 2 is an enlarged fragmentary section taken substantially along the line 2—2 of Figure 4 and illustrating in detail the features of the cotton stripping mechanism included in the present invention;

Figure 3 is a cross section through the stripping mechanism illustrated in Figure 2, such section being taken substantially along the line 3—3 of Figure 2; and Figure 4 is a cross section taken substantially along the line 4—4 of Figure 2.

For the purposes of best illustrating the present invention I have shown in Figure 1 a side elevation of a machine embodying, not only my improved cotton stripping mechanism, but also certain forms of conveying and cleaning mechanism with which my invention may be associated, particularly when the several operating mechanisms are supported by the same means, namely, a wheeled supporting frame such as a tractor of the general purpose type. Referring now more particularly to Figure 1, the reference numeral 11 indicates a tractor of the general purpose type having rear driving or traction wheels 12 and front dirigible wheel means 13. As just mentioned, the main operating devices supported in this instance by the tractor 11 comprises cotton stripping mechanism 14, combined conveying and preliminary cleaning means 15, final cleaning means 16 and a discharge elevator 17. It is not essential, of course, that these particular operating mechanisms be arranged as indicated since the present invention is concerned only with the provision of improved stripping mechanism.

The details of the cotton stripping mechanism are best illustrated in Figures 2, 3 and 4 and as there shown the stripping mechanism 14 comprises a pair of component members or side plates 18 and 19, the former constituting the laterally outer side member and the latter the inner side member. The plate member 18 comprises an elongated sheet metal body portion or plate portion of the machine and has its upper part formed with a downwardly curved or reversely bent portion 21 terminating in an inner edge or margin 22, as best shown in Figures 2 and 4. The forwardmost portion of the plate 18 extends downwardly from rear to front and terminates in a downwardly inclined nose or tip 23. The lower edge of the plate 18 is bent inwardly to provide a ledge 24 and suitably secured thereto, adjacent the forwardmost end of the plate 18, is a bottom plate 25 of substantially triangular formation, the tip of which terminates in a reversely bent nose portion 26. Adjacent the inner edge of the side member 18 there is a substantially vertically disposed triangularly shaped plate 27 which is suitably secured to the bottom 25 and to the inner downwardly extending portion 22 of the plate 18, as by rivets or bolts 28.

Extending rearwardly from the rear edge of bottom 25 are a plurality of parallel spaced slats 29 forming an upwardly and rearwardly extending bottom of this side of the stripping mechanism, such slats being suitably reenforced and connected together by a plurality of cross members 31 extending transversely thereacross and disposed in longitudinal spaced relation with respect to the slats 29. At their outer ends the cross members 31 are suitably connected to the ledge 24 of the side plate 18 while their inner ends are suitably secured to a longitudinally extending plate 32. The latter is secured at its front and lowermost end to a toe plate 33 which, in turn, is suitably secured to the bottom 25. At its upper rear end the side plate 18 has extending thereacross a substantially concave bottom plate 33a which is suitably secured at its inner margin to the inner side wall of the associated combined conveyor and preliminary cleaner 15. The major portion of the plate member 19 is disposed vertically in a longitudinal or fore and aft plane and is formed to present a substantially smooth, unbroken and uninterrupted surface or wall, the purpose of which will appear later.

Spaced rearwardly from toe plate 33 and secured to the underside of bottom 25 adjacent its rear edge and extending inwardly therefrom is a bracket 34 provided with an inwardly and upwardly directed portion 34' terminating in a bearing portion 35 providing a bearing for the lower end of a stripping roll 36. The stripping roll 36 comprises a two-part aligned tubular body having an axial shaft 37 extending therethrough. The shaft 37 is supported in bearing portion 35 adjacent its lower end, the flanges of bearing portion 35 being disposed between and abutting the proximate ends of the two parts forming the body of stripping roll 36. The stripping roll is provided with a plurality of outwardly extending stripping fingers 38 arranged in longitudinally spaced relation upon the periphery of the roll to provide a plurality of circumferentially arranged aligned rows. The upper rear ends of the stripping roll shaft 37 is suitably journaled in a bearing bracket 41 secured to a journal bracket housing 42.

Referring more particularly to Figure 4, it will be noted that each of the fingers 38 is provided with an angularly bent end portion 43, the inclination of such bent portion being in a direction opposite to the normal rotation of the stripping roll 36, and that the stripping roll 36 is so disposed that the fingers 38 operate close to the smooth unbroken wall 19. The plate 32 is provided with a right angularly disposed vertical portion, the inner edge of which is bent outwardly so as to have the marginal edge 44a thereof in close proximity to the periphery of the stripping roll 36, such angularly disposed marginal portion 44a being suitably slotted or notched so as to accommodate the passage thereof of the stripping fingers 38 so that plate 32 in addition to functioning as a reenforcing plate for the inner edge of the bottom 25 and the slats 29 comprises a stripping plate for removing cotton and other matter stripped from the plants by the fingers 39 from these fingers. It will be noted that the inclination of the marginal edge 44a of the plate 32 is such that this portion of the plate cooperates with the inclined ends 43 of the fingers 38 so that the stripped matter will be effectively removed from the fingers 38, inasmuch as the bent ends 43 leave the marginal edge 44a in a path substantially normal to the plane of the marginal edge of the stripping plate, the bent ends 43 thus receding from the notches of the plate 32 substantially perpendicularly to the marginal portion 44a thereof. Thus the stripping plate effects removal of the matter from the fingers 38 substantially axially of the bent ends 43.

A supporting frame for the cotton stripper comprises a main angle bar 45 provided with a forwardly and inwardly inclined end portion 46 supported from the side plate 18 by having the extreme forward end suitably secured to plate 18, the rearwardly and upwardly directed portion of the angle bar 45 being suitably braced to the outer side of the side plate 18 by means of a pair of longitudinally spaced substantially U-shaped brace brackets 47 and 48. A plurality of fingered members 49, 51 and 52 are suitably supported on the inner side of plate 18, members 49 and 52 being substantially duplicates of each other. Referring more particularly to Figure 4, each of these members comprises a hub 53 comprising a hollow tubular body provided internally adjacent the outer end thereof with a transverse web plate 54 having a substantially axial perforation therein, hub 53 being provided at its adjacent inner end with a reenforcing web plate 55 formed with a polygonally shaped axially extending portion 56. Hub 53 carries thereon a plurality of radially outwardly extending fingers 57 the outer ends of which are slightly curved in a direction opposite to the direction of rotation thereof, the innermost set of fingers 58 being slightly axially offset so as to be disposed for operative movement in a plane in close proximity to the ends of the stripping fingers 38 of the stripping roll 36. Fingers 57 and 58 may be suitably secured to hub 53 in any suitable or preferred manner. Extending axially through the hub 53 is a shaft or spindle 59 provided at its inner end with a polygonally tapered end adapted to be cooperatively associated with the correspondingly formed portion 56 of the reenforcing or web plate 55, the extreme end of spindle 59 being provided with a reduced threaded end with which a suitable nut and washer may be associated for retaining the hub 53 in position on the spindle 59.

The shaft or spindle 59 passes through a suitable perforation provided in the side plate member 18, the shaft being suitably journaled in a pair of opposed journal bearings 64 and 65 which are adapted to engage the outer and inner sides of the side plate 21 in assembled relation, respectively. The passage in the side plate 21 through which shaft or spindle 59 extends may be slightly elongated vertically, as indicated at 69, if desired. To maintain the shaft or spindle 59 in horizontal alignment, the extreme outer end thereof is journaled in a bearing 71 suitably secured to the vertical flange of the angle member 45. The extreme outer end of shaft or spindle 59 is preferably reduced. Adjacent such reduced end the shaft or spindle is provided with suitable splines 72 for cooperatively receiving thereon a sprocket 73.

The fingered member 51 is of substantially the same general structure as member 49 with the exception that it is slightly shorter in its hub portion, as best shown in Figure 3, the fingers thereof being adapted to pass the fingers of the fingered member 49 in partially overlapping and staggered relation. The shaft or spindle thereof is similarly journaled in the side plate 21 and upon the angle iron member 45. The sprocket member of fingered member 51 differs from that associated with the fingered member 49 in that two sets of sprocket teeth are provided thereon, such sprocket teeth being disposed in axially spaced relation.

The hub, finger, and journal bearing structures of the fingered member 52 are similar to those of the fingered member 49. The shaft or spindle 74 of fingered member 52 being substantially longer and extending outwardly beyond the vertical flange of the angle iron member 45. Sprocket 75 is provided with a slip-clutch hub portion adapted to cooperate with a similarly formed hub portion of a second sprocket 76 which has axial sliding movement with respect to the shaft or spindle 74, the cooperative relationship of the two hub portions being normally maintained by a coil spring 77. The tension of coil spring 77 may be effectively controlled by any suitable or desired tensioning means disposed upon the end of shaft or spindle 74. The purpose of the slip-clutch arrangement will more specifically hereinafter appear. It will be noted that the fingered member 52 is disposed in substantially the same position laterally of the side plate 21 as the fingered member 49, the fingers of the former cooperating in the same manner with the fingers of the fingered member 51, that is, the fingers of member 52 are adapted to pass the fingers of the member 51 in axially spaced overlapping and staggered relation.

At the forward end of the component plate portion 18 of the stripping mechanism, a plurality of inwardly and rearwardly directed guide fingers 79 are suitably secured to the vertical plate 27 for purposes of guiding the plants to the stripping roll 36 in the course of the passage of the machine down the row of plants. To prevent cotton from falling between the innermost guide fingers and plate 27, a guard plate 79' is secured to the plate and extends horizontally into the space between the innermost finger and plate 27. Adjacent the rear edge thereof, the reversely bent portion 22 of the plate member 18 is suitably secured along its vertical edge to a substantially U-shaped plate 81 (Figure 3), the web portion of which is clamped between the journal bracket portion 41 and the associated portion of the journal bracket 42. The inner leg of the U-shaped bracket 81 is suitably secured to the outer vertical edge of the plate member 19 along the rear edge thereof for purposes of securing a substantially rigid association of the component plate members 18 and 19. The rigid association of the members 18 and 19 at the rear ends thereof is further secured by an angle iron bracket 81' (Figure 2) fixed to the upper edge of plate 81 and suitably secured to the plate members 18 and 19 in any preferred or desired manner.

The plate member 19 comprises a downwardly and forwardly inclined curved body portion 82 provided at its upper edge with a reversely bent inwardly directed portion 83 and along its lower marginal edge with an inwardly directed flange 84 for purposes of substantially reenforcing such lower edge. At its forward end, the plate portion 82 is flared outwardly to provide a component plate portion 85 for the oppositely flared end plate portion 27 of the plate member 18. At its forward end and in opposed relation to the fingers 79 a similar series of rearwardly directed guide fingers 86 are provided to cooperate with guide fingers 79 in guiding the stalks, branches and twigs of the plants of the plant row being operated upon therebetween to the stripping roll 36. A guard plate 86' similar to plate 79' is secured in the same manner between the innermost of guide fingers 86 and plate portion 85. It will be readily apparent that the plate portion 82 of the plate member 19 cooperates with the fingers 38 of the stripping roll 36 by providing a substantial backing for the plants as they are led back through the stripping mechanism in the forward movement of the machine along the plant row, as best shown in Figure 4.

At its extreme tip, the plate or side member 19 is provided with a toe plate 87 suitably secured to the flared portion 85 and extending laterally outwardly therefrom. This toe plate is provided with a vertical flange 88 in which a horizontal spindle or shaft 89 is journaled, such spindle or shaft being provided with an enlarged head 91 adapted to engage the outer side of the vertical portion 88 of plate 87. Suitably secured to this shaft or spindle 89, as by means of a pair of transverse pins 92, is a bracket 93 disposed between a vertically extending supporting bracket 94 and the inner face of the vertical portion 88 of the plate 87. This bracket is provided with a rearwardly extending fork between the tangs of which a caster fork 96 is supported for horizontal pivotal movement about a pin 97. The caster fork 96 supports a ground engaging caster wheel 98 in the forked end thereof. A lever 99 is suitably secured to the enlarged head 91 of the pin or shafts 89 for a purpose to be more specifically hereinafter described.

The stripping roll 36 and the fingered members 49, 51, and 52 are driven from a shaft 101 extending horizontally through the side walls at the forward end of the associated combined conveying and preliminary cleaning means 15, secured to the inner wall of which is a gear box 102 provided with a rearwardly extending journal bearing 103. A power take-off shaft 104 is journaled in the bearing 103 and extends inwardly into the gear box 102 and drives the shaft 101 through a set of bevel gears or the equivalent. The shaft 101 extends through the outer side wall of the combined conveying and preliminary cleaning means 15 and is suitably supported in such side wall by means of a bearing 107 secured thereto.

The bearing bracket 42 is suitably journaled upon the shaft 101 adjacent the inner side wall of the combined conveying and preliminary cleaning means 15, the shaft 37 of the stripping roll 36 extending upwardly therethrough and carrying at its extreme inner end and suitably keyed or otherwise secured thereto a bevel gear which meshes with a cooperating bevel gear suitably keyed or otherwise secured to the shaft 101 within the bearing bracket 42. Between the outer end of bearing bracket 42 and the outer wall of the combined conveying and preliminary cleaning means 15 the shaft 101 carries thereon a fingered member 111 similar in construction to the fingered members 49, 51 and 52 with the exception that the inner end of fingers are not laterally bent, such fingered member 111 being suitably keyed or otherwise secured to the shaft 101 in any preferred or desired manner. The extreme upper end of the component member 18 is mounted, as at 113, for pivotal movement upon the bearing 107. Thus the stripping mechanism, by virtue of being pivotally associated with the shaft 101 through the bearing bracket 42 and with the bearing 107, may have vertical pivotal movement with respect to the combined conveying and preliminary cleaning means 15.

Adjacent its extreme outer end the shaft 101 has suitably keyed or otherwise secured thereto a pair of sprockets 113 and 114, the latter being suitably connected to the clutching sprocket 76 by means of a sprocket chain and thereby providing a drive connection for the fingered members 49, 51 and 52 through the sprockets associated with the shafts of the fingered members by means of sprocket chains 116 and 117.

The two component plate or side members 18 and 19 of the stripping mechanism are preferably supported by a U-shaped inverted frame 121 having the lower ends of the legs thereof pivotally connected to the plate members 18 and 19. Preferably, the frame 121 is formed of angle iron, and the intermediate or upper portion of the frame 121 carries a bracket 122 to which is pivotally connected a forwardly extending arm 123 fixedly secured to or formed integrally with a tubular sleeve member 124. The tubular member is journaled upon a horizontally disposed tubular shaft 125 suitably supported in the ears 126 of one or more brackets 126 secured to the forward end of the tractor. For the purpose of balancing the weight of the cotton stripping mechanism the sleeve or tubular member 124 is provided with one or more arms 133 to which one end of a coil spring 134 is connected, the rear end of the spring 134 being suitably anchored, as by link means 135, to the tractor or to the combined conveyor and preliminary cleaner 15.

For the purpose of raising and lowering the forward end of the cotton stripping mechanism relatively to the ground the lever 99 associated with the pivoted bracket 93 is extended upwardly and is connected with a rearwardly extending rod or link 136. This rod preferably extends to a point adjacent the operator's station on the tractor and may be provided with any form of control means actuable by the operator for controllably shifting the rod 136 fore and aft. Since the spring means 134 substantially balances the weight of the forward portion of the cotton stripper the lever 99 is easily rocked to adjust the height of the stripper, pivoting the same about the axis of the shaft 101. The spring means 134 also serves to effectively eliminate any sudden shock which otherwise might be transmitted thereto in the event that the caster wheel 98 should suddenly drop into a depression or the like.

To facilitate dirigible movement of the combined tractor and cotton stripping mechanism and to dispose the latter in inoperative position for transport purposes it may be desirable to provide some form of power operated lifting mechanism for raising the cotton stripper to its inoperative position. For this purpose the present invention contemplates the provision of an upwardly extending arm 151 operatively associated with the sleeve 124 or the shaft 125. The upper end of the arm 151 has connected to it a rearwardly extending chain 152 or the equivalent thereof. The rear end of the chain 152 is adapted to be anchored to the upper end of a vertically disposed lever 153 (Figure 1) pivotally supported on the tractor and operated by a connecting link 154, such link being pivotally connected at its rear end with the crank arm 155 of a power lift mechanism 156 on the tractor 11. Operation of the power lift 156 will swing the lever 153 and hence will serve to raise the frame 121 or lower the same. Thus, the stripping mechanism may be elevated completely free of the ground surface, thereby providing for unimpeded dirigibility of the tractor for transport purposes or for reverse turning thereof upon completion of the harvesting of the plants in one row.

In operation, the plants of the row being operated upon are led to the stripping roll thereof by the fingers 79 and 86. The plants are maintained in position for effective stripping by the stripping roll 36 by the smooth or continuous wall of the side portion 82 of the cooperating component member 19. Cotton or other matter stripped from the plants are carried around over the high side of the stripping roll whence they are removed by the fingers on the inclined portion 48a of the stripping plate 52. These fingers engage in between the stripping fingers 38 on the stripping roll 36. As the latter rotates, in a clockwise direction as illustrated in Figure 4, the outer bent ends 43 of the stripping fingers pass through or recede from the inclined portion 48a of the stripping plate in a direction which is substantially axially with respect to the stripping fingers on the stripping roll 36. Thus easy removal of the cotton or other material is provided for.

The cotton removed by the plate fingers 44a is deposited upon the bottom of the plate member 18. In addition, the outer fingers of the fingered members 49, 51 and 52 cooperate with the stripping plate in removing the cotton and foreign matter from the stripping roll by engaging such matter and directing it upwardly along the slotted bottom of the component portion 18 of the stripping mechanism. As the gathered matter is conveyed in turn rearwardly by the fingered members 49, 51 and 52, foreign matter may freely drop through the slats 29. It will be of course readily apparent that the reversely bent portion 22 of the component portion 18 of the stripping mechanism serves as a hood to prevent cotton from being thrown upwardly and outwardly of the component portion 18 to prevent loss of such matter as may be thrown up by the fingered members 49, 51 and 52. Should foreign matter of substantial size interfere with the free operation of the fingered members 49, 51 and 52, causing one or all of these members to be stopped, the slip clutch means associated with the shaft of the fingered member 52 will slip thereby insuring against any breakage of parts of the fingered members due to such resistance.

While I have described above and illustrated in the accompanying drawings the preferred structural embodiment of the present invention, it will be apparent that my invention is not to be limited to the specific means shown and described, but that, in fact, widely different means may be employed in the practice of the broader aspects of my invention.

What I claim, therefore, and desire to secure by Letters Patent is:

1. In a cotton harvesting machine, row-following plant stripping means comprising a pair of stationary members adapted to guide plants therebetween, and stripping means carried by one of said stationary members, and adapted to be operatively moved in a path lying closely adjacent the other of said stationary members for removing cotton from said plants as the latter are guided therebetween, said means also being adapted to cooperate with said one stationary member for removing cotton from the stripping means.

2. In a cotton harvesting machine, row-following plant stripping means comprising a pair of plate members spaced apart to guide plants therebetween, and a downward and forwardly inclined stripping roll carried by one of said members and having fingers thereon mounted for rotation adjacent the other of said members and adapted to cooperate therewith for removing cotton from said plants as the latter are guided between said plate members.

3. In a cotton harvesting machine, row-following plant stripping means comprising a pair of stationary plate members adapted to guide plants therebetween, one of said plate members being disposed substantially vertically and presenting a substantially smooth wall, and a stripping roll carried by the other of said members and adapted to cooperate with the lower portion of said one stationary member for removing cotton from said plants as the latter are guided therebetween.

4. In a cotton harvesting machine, row-following plant stripping means comprising a pair of plate members disposed substantially vertically in spaced apart relation and adapted to guide plants therebetween, one of said members presenting a substantially smooth wall, a rotatable stripping roll carried by the other of said members and having fingers adapted to move in a path closely adjacent to but out of contact with the smooth wall of said one member for removing cotton from said plants, and means carried by the other of said plate members and adapted to remove cotton from the stripping roll.

5. In a cotton harvesting machine, row-following plant stripping means comprising a pair of vertically disposed spaced apart stationary members adapted to guide plants therebetween, one of said members presenting a substantially smooth curved wall, means carried by said members for guiding plants into the space therebetween, a single rotatable stripping roll carried by the other of said members and having fingers adapted to cooperate with smooth wall of said one member for removing cotton from said plants as the latter are guided therebetween, and stationary means carried by the other of said members for removing cotton from said stripping roll.

6. In a cotton harvesting machine, row-following plant stripping means comprising a pair of laterally spaced apart stationary plate members, means carried thereby and adapted to guide plants therebetween, one of said plate members being arranged substantially vertically and presenting a substantially smooth wall, a rotatable stripping roll carried by the other of said stationary members and provided with cotton engaging fingers rotatable adjacent said smooth wall and cooperating therewith for removing cotton from the plants as they are guided therebetween, and a plurality of fingers carried by the other of said stationary members and disposed between the fingers of said stripping roll for removing cotton from the latter.

7. A row-following stripping mechanism for cotton harvesting machines comprising a pair of relatively stationary component members, one of said members providing a smooth curved wall, the other of said members including stripping means spaced from but disposed closely adjacent said wall for removing cotton from plants guided between said members, and means carried by said relatively stationary component members forming a throatway cooperating to hold the plants during their engagement by said stripping means.

8. A row-following stripping mechanism for cotton harvesting machines comprising a pair of component members, one of said members providing a relatively stationary continuous wall, the other of said members including an inner portion disposed adjacent said wall, a stripping roll carried by said inner portion and comprising a rotatable body having outwardly extending fingers thereon adapted to cooperate with said wall for removing cotton from plants guided between said component members.

9. A row-following stripping mechanism comprising a pair of forwardly and downwardly inclined component members, the upper marginal portions of said members being curved to form a throatway accommodating the passage of plants therebetween and one of said members providing a continuous guiding wall adjacent the lower portion thereof, a roll having outwardly directed fingers extending from the periphery thereof rotatably supported on the lower portion of the other of said members, said fingers being adapted to cooperate with said guiding wall for stripping cotton from plants guided between said component members, and means on said other member to strip cotton from said roll.

10. A row-following stripping mechanism comprising a pair of forwardly and downwardly inclined component members, one of said members providing a continuous guiding wall and the other member having a laterally outwardly disposed wall and a laterally inwardly disposed section spaced from said wall, a roll having outwardly directed fingers extending from the periphery thereof rotatably supported on the laterally inner section of the other of said members, said fingers being adapted to cooperate with said wall for stripping cotton from plants guided between said component members, and a stripping plate carried on said laterally inner section and adapted to remove cotton from said roll for deposit within said other member between the outer wall thereof and said inner section.

11. A row-following stripping mechanism comprising a pair of forwardly and downwardly inclined component members, one of said members providing a continuous guiding wall and the other of said members having a laterally inwardly disposed turned up edge, a roll having outwardly directed fingers extending from the periphery thereof rotatably supported on the laterally inner portion of the other of said members, said fingers being adapted to cooperate with said continuous wall for stripping cotton from plants guided between said component members, means on said turned up edge forming a stripping plate adapted to remove cotton from said roll for deposit within said member, and a plurality of fingers on said edge and disposed in between the fingers of said roll for stripping cotton therefrom.

12. In a cotton harvesting machine, row-following plant stripping means comprising a substantially vertically disposed stationary plate member presenting a smooth wall, a second plate member disposed adjacent said vertically disposed plate member, said plate members having forwardly diverging portions serving as means for guiding plants along said smooth wall, a rotatable stripping roll disposed on said second plate member adjacent said smooth wall and provided with stripping fingers cooperating therewith to remove cotton from the plants as they are guided between said wall and roll, and means cooperating with the latter for removing cotton therefrom.

13. A cotton stripper comprising a pair of laterally spaced vertically disposed members flaring laterally outwardly at their upper portions, one providing a stationary surface adjacent the lower portion thereof and the other being provided with bracket means adjacent its lower portions, and rotatable means journaled on said brackets closely adjacent said surface and cooperating therewith for removing cotton from the plants.

14. A cotton stripper comprising a pair of substantially vertically disposed members, one providing a smooth substantially unbroken surface along which the plants are guided and the other spaced laterally therefrom and providing a cotton receiving channel alongside said surface, and a rotatable member carried adjacent the inner edge of said channel and having a plurality of stripping fingers movable closely adjacent said wall and cooperating therewith to remove cotton from said plants and to deposit the same within said channel.

15. A row-following stripping mechanism comprising a pair of forwardly and downwardly inclined component members, one of said members providing a continuous guiding wall, a roll having outwardly directed fingers extending from the periphery thereof rotatably supported on the other of said members, said fingers being adapted to cooperate with said wall for stripping cotton from plants guided between said component members, and means in said last named member adapted to concurrently convey and remove foreign matter from cotton stripped from the plants and deposited therein by said roll.

16. A row-following stripping mechanism comprising a pair of forwardly and downwardly inclined component members, one of said members providing a continuous guiding wall, a roll having outwardly directed fingers extending from the periphery thereof rotatably supported on the other of said members, said fingers being adapted to cooperate with said wall for stripping cotton from plants guided between said component members, a stripping plate on said last named member adapted to remove cotton from said roll for deposit within said member, and means within said latter member adapted to convey said cotton rearwardly of said member and to simultaneously remove foreign matter from said cotton.

17. A cotton harvesting machine comprising row-following, plant stripping means comprising a pair of stationary component members adapted to guide plants therebetween, a downwardly and forwardly inclined stripping roll carried by one of said stationary members adapted to cooperate with the other of said stationary members for removing cotton from said plants as the latter are guided therebetween, and means adapted to receive cotton from said roll and arranged for concurrently conveying and removing foreign matter from cotton stripped from the plants by said stripping roll.

18. A cotton harvesting machine comprising row-following, plant stripping means including a pair of stationary component members adapted to guide plants therebetween, a downwardly and forwardly inclined stripping roll carried by one of said stationary members adapted to cooperate with the other of said stationary members for removing cotton from said plants as the latter are guided therebetween, means carried by said one member for removing cotton from said stripping means, and means carried by one of said members for receiving cotton from said removing means for concurrently conveying and removing foreign matter from cotton stripped from the plants by said stripping roll.

BRUCE MORSE.